United States Patent [19]

Lapides

[11] Patent Number: 5,264,056
[45] Date of Patent: Nov. 23, 1993

[54] METHOD AND APPARATUS FOR ANNEALING NUCLEAR REACTOR PRESSURE VESSELS

[75] Inventor: Melvin E. Lapides, Palo Alto, Calif.

[73] Assignee: Electric Power Research Institute, Inc., Palo Alto, Calif.

[21] Appl. No.: 831,892

[22] Filed: Feb. 5, 1992

[51] Int. Cl.⁵ .............................................. C21D 1/62
[52] U.S. Cl. ..................................... 148/713; 266/127
[58] Field of Search ............... 148/713, 714, 606, 627, 148/636, 639, 708, 709; 266/114, 124, 127, 123, 134, 87

[56] References Cited

U.S. PATENT DOCUMENTS

| | | | |
|---|---|---|---|
| 4,077,814 | 5/1978 | Kreidler et al. | 148/713 |
| 4,602,767 | 7/1986 | Spiegelman et al. | 266/87 |
| 5,025,129 | 6/1991 | Miller et al. | 266/87 |

*Primary Examiner*—Scott Kastler
*Attorney, Agent, or Firm*—Flehr, Hohbach, Test, Albritton & Herbert

[57] ABSTRACT

A nuclear reactor annealing apparatus and method for annealing a vessel of the reactor by utilizing a non-aqueous fluid, a means for replacing water in the vessel with the non-aqueous fluid, a means for heating the non-aqueous fluid to a predetermined temperature and for a predetermined length of time. The non-aqueous fluid creates less pressure than water at the same temperature and is in communication with said vessel so that heating the non-aqueous fluid in turn heats the vessel thereby annealing the vessel. A can device is used to anneal only a portion of the vessel walls.

13 Claims, 2 Drawing Sheets

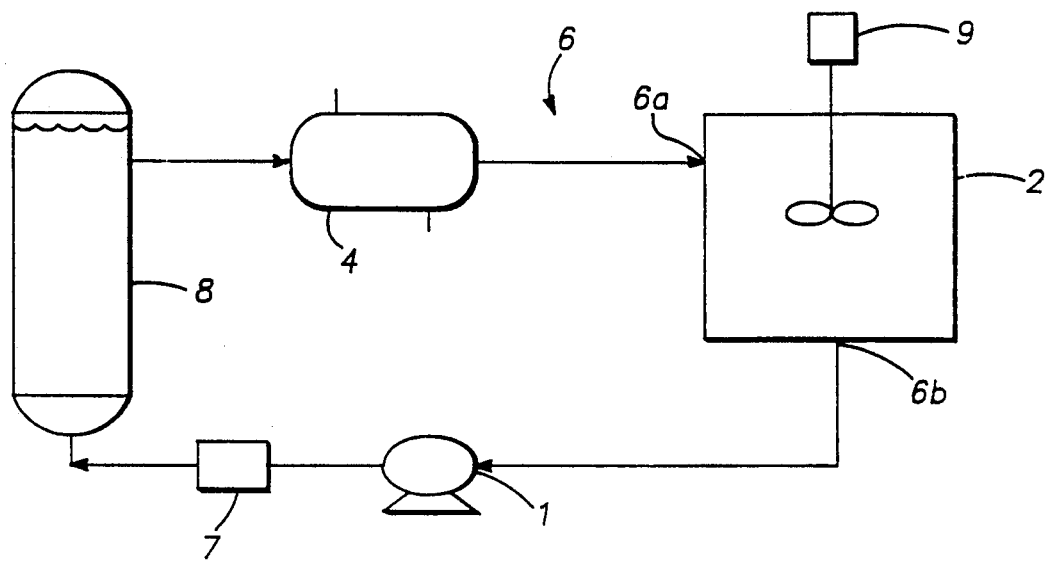
FIG.—1
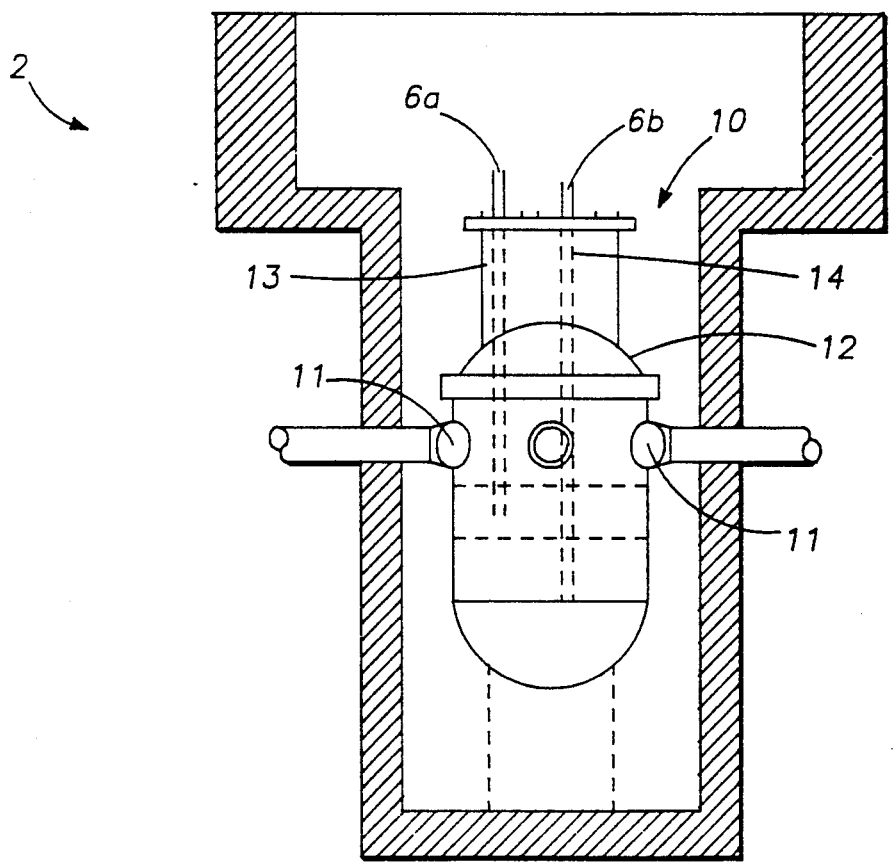
FIG.—2

5,264,056

METHOD AND APPARATUS FOR ANNEALING NUCLEAR REACTOR PRESSURE VESSELS

FIELD OF THE INVENTION

This invention relates generally to a method and apparatus for annealing interior walls of nuclear reactor pressure vessels embrittled by high neutron flux. Non-aqueous fluid is utilized as the annealing solution.

BACKGROUND OF THE INVENTION

Pressurized water-moderated (PWR) and boiling water nuclear (BWR) reactors use fission for producing steam to drive a steam turbine. A metal reactor core and other control apparatus, commonly referred to as reactor internals, are disposed in a metal vessel filled with water. Fission takes place within the reactor core whereby the energy of the fission products is transferred to the water. In a PWR, the heated water is pumped from the reactor vessel through a heat exchanger in which it transfers its heat energy to another circuit of water to form steam to drive a turbine. In a BWR, the steam goes directly from the reactor to the turbine.

In both types of reactors, neutrons, which are a product of the nuclear reaction, embrittle the reactor core walls. Continued embrittlement of the walls may result in excessive sensitivity to fracture. Periodic annealing of the vessel walls can reverse the effects of embrittlement, thus preventing fracture sensitivity and extending the useful life of the vessel.

Proper annealing requires heating the vessel walls for a long period of time at a high temperature. A typical steel reactor vessel requires heating in the range of 650°-850° F. dependent on the chemical composition of the steel. The heating duration ranges from 2-9 days dependent on the temperature and amount of property recovery sought. The temperature of the annealing operation is carefully controlled to prevent excessive vessel stress or over-temperature of the primary shield concrete.

One method for annealing pressurized water-moderated reactor vessels is to raise the primary system water to the required annealing temperature and circulate the heated water through the vessel. As the temperature of the water increases, the pressure increases. Thus, the annealing temperature is limited by design pressure limits of the reactor vessel and primary system. Standard reactors using heated water for annealing are limited by a maximum water temperature of 650° F., which either achieves only limited embrittlement recovery and/or requires excessive time for substantial recovery.

Another method predicates removing all internal components from the reactor pressure vessel and introducing into the vessel an electrical resistance heater to achieve the required annealing temperatures. This method is complex, time consuming and not feasible at storage limited sites due to difficulties associated with the reactor internals removal process. Since, the heating element transfers heat to the vessel by thermal radiation, it must reach temperatures substantially hotter than the target annealing temperature. Other components in close proximity to the heating element with lower temperature limits than the vessel must be protected from this high temperature source.

SUMMARY OF THE INVENTION

It is a general object of the present invention to provide an improved apparatus and method for annealing the walls of a nuclear reactor vessel.

It is another object of the invention to provide an apparatus and method that achieves high annealing temperatures without exceeding the temperature and pressure limitations of the reactor components and reactor vessel.

It is also an object of the invention to provide an apparatus and method that anneals only the embrittled portion of the vessel walls.

It is a further object of the invention to provide an apparatus and method that employs a heat transfer fluid for annealing the vessel walls.

The foregoing and other objects of this invention are achieved by an annealing apparatus and method for annealing a reactor vessel; the apparatus utilizes a heat transfer fluid. Water in the vessel is replaced with a high temperature heat transfer fluid. A heating means heats the heat transfer fluid to a predetermined temperature and maintains the fluid at the elevated temperature for a predetermined length of time sufficient to anneal the vessel.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1 is a simplified schematic of an embodiment of the present invention.

FIG. 2 is a frontal view, partly in section, of a conventional nuclear reactor vessel.

DESCRIPTION OF THE PREFERRED EMBODIMENT

Figure 3:
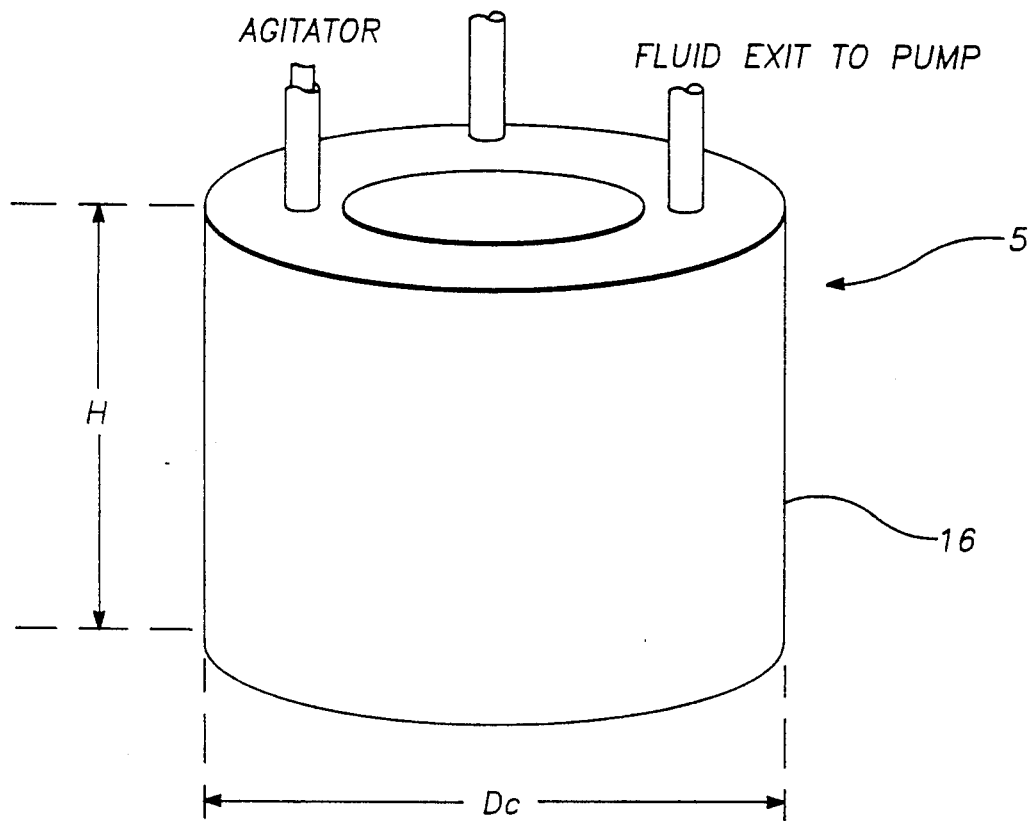
FIG. 3 is side plan view of a tank for confining the fluid in the vessel in accordance with another embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the claims.

Turning now to the drawings, wherein like components are designated by like reference numerals, attention is initially directed to FIG. 1. The present invention in its most basic form comprises heat exchanger 4 for raising the temperature of heat transfer fluid to the desired temperature for annealing and pump 1 for circulating the high temperature heat transfer fluid through vessel 2. In a more complex embodiment, annular tank 5 in FIG. 3, is inserted in vessel 2 to confine the heat transfer fluid within region 3 of vessel 2 in most need of annealing.

This invention solves a number of basic problems. First, the pressure sensitivity of vessel 2 and other reactor components does not limit the annealing process, since the heat transfer fluid can reach the necessary temperature at a sufficiently low pressure. This permits simplified sealing to retain the fluid within vessel 2 at locations such as the primary coolant piping nozzles marked 11 in FIG. 2. Reactor coolant loop components, such as pump seals (not shown), are not exposed to elevated temperatures during the annealing process. For optimization, a tank device 5, FIG. 3, confines heat transfer fluid to the area of vessel 2 in need of annealing. In addition, tank 5 reduces the volume of heat transfer fluid required and prevents contamination of vessel 2 by heat transfer fluid.

FIG. 1 shows a simplified schematic of an embodiment of the present invention for achieving in-service annealing of reactor pressure vessels without requiring substantial reactor disassembly or exposure of the primary coolant pressure boundary to pressures in excess of their design capability. A means to achieve low pressure at high temperature is using a non-aqueous fluid as the heat transfer fluid. Non-aqueous fluid has a higher boiling point than water, therefore target annealing temperatures are achievable at pressures much lower than those associated with water. Temperatures between 750°–800° F. are considered feasible using non-aqueous fluids that are organic, inert and immiscible with water. These non-aqueous fluids, at annealing temperature, operate at pressures of only a few atmospheres.

The heat transfer fluid circulates through closed fluid circuit 6 to carry out the annealing of vessel 2. Fluid circuit 6 includes: circulation pump 1 for transporting heat transfer fluid through the circuit 6, heater 4 for maintaining the heat transfer fluid at the annealing temperature, on-line filter 7 for removing any carbonization products that are created when the fluid is held at high temperature for extended periods of time, storage tank 8 for storing excess heat transfer fluid, and mixer 9 for agitating the heat transfer fluid in vessel 2 for maintaining a substantially constant annealing temperature along the vessel walls.

In operation, the water normally contained in vessel 2 is drained and heat transfer fluid is introduced into vessel 2 up to, but below the primary coolant nozzles 11. These outlets are then sealed, using metalized diaphragms where valves do not exist. Leak-tight diaphragms are feasible due to the low annealing pressure. The heat transfer fluid is heated and sustained at the annealing temperature by heater 4 for the desired annealing time period. During the annealing period, pump 1 circulates heat transfer fluid through fluid circuit 6 and mixer 9 agitates the heat transfer fluid while in vessel 2. Filter 7, which can be positioned in fluid circuit 6 as shown in FIG. 1 or upstream of pump 1, removes debris from heat transfer fluid.

In an alternate embodiment, heater 4 may be eliminated by operating the reactor at a low level to heat the fluid. However, this alternate embodiment may raise regulatory and chemical contamination concerns.

The interconnections between the above embodiment and a conventional nuclear reactor unit is shown in FIG. 2. The core (fuel and rods) in the nuclear reactor unit will be in one of two states, either "core intact" or "core removed". In "core intact" state, two control rod units (not shown in FIG. 2) are removed to provide access to and from fluid circuit 6 through reactor pressure vessel (RPV) head 12. Pipes 13 and 14 are inserted into the passages previously occupied by the control rod units. Pipe 13 extends down to region 3 in vessel 2 and serves as inlet 6a for vessel 2. Pipe 14 extends down to near the bottom of vessel 2 and serves as outlet 6b for vessel 2. Heat transfer fluid from fluid circuit 6 enters vessel 2 through pipe 13 and is pumped out of vessel 2 and back into fluid circuit 6 through pipe 14. Optionally, a third control rod unit may be removed for insertion of mixer 9, FIG. 1.

In "core removed" state, all of the fuel units are removed. Three of the control rod tubes are then used for pipes 13, 14 and mixer 9. The other control rod tubes are sealed. The present invention may operate effectively under either "core intact" or "core removed" state.

In an alternate embodiment, shown in FIG. 3, heat transfer fluid is contained or confined in annular tank 5, which is lowered into vessel 2 after the internal components and RPV head 12 are removed from vessel 2. Tank 5 extends axially to cover region 2a of the pressure vessel which is significantly embrittled. Annular tank 5 is incorporated into fluid circuit 6 along with the other components shown in FIG. 1 and described above. Heat transfer fluid heats tank 5 which in turn heats the walls of vessel 2 to the necessary annealing temperature.

The use of tank 5 requires the removal of the reactor core internals. Thus, RPV head 12, which is normally on vessel 2 during reactor operation and the basic annealing embodiment described above, is removed from vessel 2. RPV head 12 is replaced by flat plate, not shown. As with RPV head 12, pipes 13, 14 and mixer 9 extend through passages in the flat plate into vessel 5. Fluid circuit 6 is connected to vessel 5 and functions in the same manner as in all of the above-described embodiments. The difference with the tank embodiment is that pipes 13, 14 are connected to tank 5 so that their ends input and output heat transfer fluid from tank 5 rather than vessel 2. Additionally, mixer 9 agitates the fluid in tank 5 rather than vessel 2.

Tank 5 is configured from a metal or alloy with dimensions such that outer wall 16 expands outwardly and makes intimate contact with the walls of pressure vessel 2 when at the desired annealing temperature. Thus, $D_{tank} + \text{Expansion when heated} = D_{vessel}$. Selection of materials for this feature is facilitated by the low operating pressure and relative chemical inertness of a non-aqueous, heat transfer fluid. Furthermore, low pressure operation allows tank 5 to be a thin-walled component, which expands outwardly with low fluid pressure.

Height H of tank 5 is determined from heat transfer analysis to heat the embrittled region 3 to the required temperature. In the preferred embodiment, height H is approximately equal to the length of the embrittlement zone plus 4 times the vessel wall thickness ($H = L_{embrittlement} + 4*T_{vessel}$).

Both embodiments are advantageous over conventional methods by use of a high temperature, low vapor pressure fluid that is non-reactive with water and non-corrosive to the metallic components of the reactor system. A number of organic fluids possess these properties, particularly those that have been developed and verified for use as a reactor coolant during early developmental stages (1950's–1960's) of nuclear reactors. These include, but are not limited to alkyl benzenes, diphenyls and diphenyl oxides in pure or mixed forms.

An example of a useful organic fluid is Dowtherm A, a commercially available mixture of diphenyl and diphenyl oxide. Dowtherm A has a vapor pressure of only 68 psia at 650° F., and in contrast the corresponding pressure for water at 650° F. exceeds 2000 psia. The choice of implementation depends on specific vessel and siting issues related primarily to concerns about residual contamination of the primary coolant stream with organic materials and disposal of the organic fluid. The annular tank system minimizes these concerns but requires removal of the internal reactor components.

While the present invention has been shown and described in what is presently conceived to be the most practical and preferred embodiment of the present invention, it will become apparent to those of ordinary skill in the art that many modifications thereof may be within the scope of the invention, which scope is to be accorded the broadest interpretation of the claims so as to encompass all equivalent structures and devices.

What is claimed:

1. A nuclear reactor vessel annealing system comprising:
    a closed fluid system including said reactor vessel;
    a low vapor pressure non-aqueous fluid having a vapor pressure at elevated temperatures substantially less than the vapor pressure of water in said closed fluid system;
    means for heating said non-aqueous fluid to a predetermined temperature of at least 650° F.; and
    means for circulating said non-aqueous fluid through said closed fluid system and said vessel so that said non-aqueous fluid is in heat exchange relationship with at least the portion of said vessel to be annealed.

2. A nuclear reactor vessel annealing system as recited in claim 1, further comprising means for agitating said non-aqueous fluid in said vessel.

3. A nuclear reactor vessel annealing system as recited in claim 1, wherein said non-aqueous fluid is organic.

4. A nuclear reactor vessel annealing apparatus as recited in claim 3, wherein said non-aqueous fluid is selected from the group consisting of alkyl benzenes, diphenyls and diphenyl oxides in pure or mixed form.

5. A nuclear reactor vessel annealing system as recited in claim 1, wherein said heating means is low level reactor operation.

6. A nuclear reactor vessel annealing system as recited in claim 1, wherein said heating means is a heat exchanger.

7. A nuclear reactor vessel annealing system as recited in claim 1, further comprising:
    a means in said closed fluid system for confining said non-aqueous fluid so that said non-aqueous fluid in said confining means is in heat exchange relationship with only a portion of said vessel; whereby said heated heat transfer fluid heats said portion of said vessel to anneal said portion.

8. A nuclear reactor vessel annealing apparatus as recited in claim 7, wherein said confining means is an annular tank so that heat is transferred from said non-aqueous fluid to said annular tank to said portion of said vessel.

9. A nuclear reactor vessel annealing apparatus as recited in claim 1, further comprising:
    an external fluid circuit which pumps said non-aqueous fluid into and out of said vessel for supplying heated non-aqueous fluid and removing cooler non-aqueous fluid.

10. A nuclear reactor vessel annealing system for annealing a vessel of the reactor:
    a fluid system including said reactor vessel;
    a heat transfer fluid in said fluid system;
    a means for heating said heat transfer fluid to a predetermined temperature and for a predetermined length of time; and
    a means for confining said heat transfer fluid so that said heat transfer fluid in said confining means is in heat exchange relationship with a portion of said vessel in said closed fluid system;
    whereby said heated heat transfer fluid heats said portion of said vessel to anneal said portion of said vessel.

11. A nuclear reactor vessel annealing system as recited in claim 10, wherein said heat transfer fluid is non-aqueous so that heating said heat transfer fluid creates less pressure than water at the same temperature.

12. The method of annealing the vessel of a nuclear reactor, comprising the steps of:
    circulating a low vapor pressure non-aqueous heat transfer fluid through said vessel whereby said heat transfer fluid is in heat exchange relationship with at least a portion of said vessel, said non-aqueous heat transfer fluid having a vapor pressure substantially less than vapor pressure of water at elevated temperatures;
    heating said heat transfer fluid to a predetermined temperature of at least 650° F.; and
    maintaining said heated heat transfer fluid in heat exchange relationship with said vessel for a predetermined length of time;
    whereby said heat transfer fluid heats at least said portion of said vessel to annealing temperature.

13. A nuclear reactor annealing method as recited in claim 12, further comprising the step of:
    containing said non-aqueous fluid so that said non-aqueous fluid heats only a portion of said vessel.

* * * * *